United States Patent Office 3,565,863
Patented Feb. 23, 1971

3,565,863
HIGH MOLECULAR POLYURETHANE RESINS
Hans-Georg Schmelzer, Cologne-Stammheim, and Kuno Wagner, Wolfgang von der Emden, and Ernst-Ulrich Kocher, Leverkusen, Germany, assignors to Farbenfabriken Bayer Aktiengesellschaft, Leverkusen, Germany, a corporation of Germany
No Drawing. Filed Sept. 15, 1965, Ser. No. 487,583
Claims priority, application Germany, Sept. 17, 1964, F 43,999
Int. Cl. C08g 22/14
U.S. Cl. 260—67                                            4 Claims

ABSTRACT OF THE DISCLOSURE

Polyurethane resins prepared by reacting a polyoxymethylene which has alcoholic hydroxyl groups but which is substantially free from semi-acetalic hydroxyl groups and which has a molecular weight in the range of 500 to 4000 with an organic polyisocyanate at a temperature of from 50° C. to 200° C.

---

This invention relates to high molecular polyurethane resins and to a method for preparing the same. More particularly, it relates to the formation of polyurethane resins from polyoxymethylenes and organic isocyanates.

High molecular weight polyurethane resins have been prepared from polyisocyanates and compounds having hydroxyl groups. Polyesters, polyethers, polythioethers and hydrogenated copolymers of carbon monoxide and ethylene have been disclosed as compounds suitable for reacting with polyisocyanates to form various types of resinous materials including foams, elastomeric products and castings. However, by reacting known hydroxyl-containing compounds such as polyesters which are obtained from the reaction of polycarboxylic acids and polyols and have a molecular weight of about 2,000 with toluylene diisocyanate and isomeric mixtures thereof, it was necessary to use chain-lengthening agents in order to attain a product having desirable elastomeric properties and hardness. However, in the presence of moisture and organic solvents, the physical properties, such as, tensile strength and permanent elongation were greatly effected.

Due to the disadvantages of these polyurethane products, it was proposed that high molecular weight polyoxymethylenes, having a molecular weight between about 4,000 and 250,000, be combined with polyurethanes in varying proportions such as from 5 to 95 to 95 to 5 percent by weight. However, these high molecular weight polyoxymethylenes contained semi-acetalic groups which reacted sluggishly, if at all, with the isocyanates.

In addition, most of the polyoxymethylenes were unstable in the presence of heat and were therefore undesirable in polymeric compositions. However, it has been found that polyoxymethylenes could be stabilized against elevated temperatures by modifying the polyoxymethylenes with isocyanates. Furthermore, it has been found that the thermal stability of the polyoxymethylene polymers could be enhanced by incorporating into the polymer structure, units derived from cyclic ethers having at least two adjacent carbon atoms to form copolymers which may be stabilized with from about 0.1 percent to about 10 percent by weight of isocyanate. Even though these isocyanate-stabilized copolymers were stable to heat, they were not resistant to aromatic hydrocarbon solvents, and were unsuitable as casting compositions.

It is, therefore, an object of this invention to provide polyurethane resins which are not subject to the disadvantages of those heretofore known. It is another object of this invention to provide polyurethane resins having elastic properties without the use of chain-lengthening agents. It is another object of this invention to provide polyurethane resins from polyoxymethylenes which are resistant to organic solvents. It is a further object of this invention to provide polyurethane resins which are resistant to swelling in the presence of aromatic hydrocarbons. It is still another object of this invention to provide an improved method for making high molecular polyurethane resins from polyoxymethylenes.

The foregoing objects and others which will become apparent from the following description are accomplished in accordance with the invention, generally speaking, by providing a process for preparing high molecular polyurethane resins in which polyoxymethylenes having alcoholic hydroxyl groups and a molecular weight of between 500 to 4,000 are reacted with polyisocyanates. More particularly, this invention contemplates the use of polyoxymethylenes having terminal alcoholic hydroxyl groups, polyhydroxyl compounds, polyisocyanates and, if desired, chain-lengthening agents to form polyurethane resins having desirable physical properties.

By using low molecular weight polyoxymethylenes containing alcoholic hydroxyl end groups for the preparation of these polyurethane resins, a product is obtained which has elastic properties and which heretofore could not be obtained from the polycondensation or polymerization products and the usual glycol-chain-lengthening agents. By reacting, for example, 10 parts by weight of a stable polyoxymethylene of molecular weight 2,500 which contains terminal alcoholic hydroxyl groups and 100 parts by weight of an adipic acid ethylene glycol polyester having a molecular weight of 2,000, which contains alcoholic hydroxyl end groups with an excess of from 2 to 4 parts by weight (above the equivalent quantity of reactive hydrogen atoms present) of toluylene diisocyanate (2,4) or isomeric mixtures thereof with toluylene diisocyanate (2,6) in the ratio of from 65:35 or 80:20, a pourable reaction mixture is obtained without the use of any chain-lengthening agent. This product can be worked up by known casting processes to form molded articles having highly elastic properties such as could only be obtained on the basis of the same polyesters with the use of valuable diisocyanates and suitable chain-lengthening agents such as naphthalene diisocyanate (1,5).

For the preparation of the high molecular synthetic resins, a suitable low molecular weight polyoxymethylene, having a molecular weight between about 500 and 4,000 and having stable alcoholic hydroxyl groups which are reactive with isocyanates, are employed. These low molecular weight polyoxymethylenes can be prepared by various known processes. For example, they may be prepared by the copolymerization of trioxane or formaldehyde with co-monomers such as 1,3-dioxolane, 1,3-oxothiolane, higher membered 1,3-dioxa-heterocyclic compounds, alkylene oxides such as ethylene oxide and propylene oxide, styrene, acrylonitrile, 1,3-di-(methanesulphonyl)-imidazolidine, 3-(methane-sulphonyl)-oxazolidine, and if desired dihydric alcohols such as ethylene glycol, butane-(1,4)-diol and hexane-(1,6)-diol as chain-breaking reagents. Different low molecular weight polymers can be obtained according to the reaction conditions, the type and quantity of catalyst and the quantity of co-monomer. Examples of catalysts which may be used are boron trifluoride, adducts of boron trifluoride and ether, nitriles and alcohols, hydrofluoboric acid, sulphuric acid, perchloric acid, thionyl chloride, and phosphorus oxychloride. These polyoxymethylenes have substantially semi-acetalic hydroxyl end groups. They can be converted into both thermally and chemically stable low molecular weight polyoxymethylenes with genuine alcoholic hydroxyl end groups by depolymerization down to co-monomer units by the method known per se for high molecular weight polyoxymethylenes. Low molecular weight polyoxymethylenes having the same properties can also be obtained by the etherification of low molecular weight ω,ω'-dihydroxy-polyoxymethylenes with dihydric alcohols, by reaction of low molecular weight ω,ω-dihydroxy-polyoxymethylenes with glycol formal, with low molecular weight polyacetals which are produced in the polycondensation of glycols such as, ethylene glycol with formaldehyde, with mercaptoethanol, ethylene oxide and propylene oxide in the presence of acid or basic catalysts. It is possible to employ together with the low molecular weight polyoxymethylenes containing alcoholic hydroxyl groups the usual polyhydroxyl compounds known in the art such as polyesters, polyethers, polyester amides, polythioethers and polyacetals. The polyester for instance can be prepared from polycarboxylic acids and polyhydric alcohols in a polycondensation reaction.

Examples of polycarboxylic acids are aliphatic, aromatic, and heterocyclic acids such as, terephthalic acid, cyclohexane dicarboxylic, succinic acid, napthyl dicarboxylic, norcamphane dicarboxylic, carbonic, dimerized fatty acids, trimerized fatty acids, para-carboxycarbanilic, suberic, azelaic, adipic, sebacic, glutaric, dimethyl malonic, alpha-ethylsuberic, oxalic, alpha, alpha-diethyladipic dicarboxy diethyl ether, ortho-phthalic, hexahydroortho-phthalic, sulphonyl dipropionic and many other such acids. Examples of the preferred aliphatic dicarboxylis acids include adipic, succinic, azelaic, suberic, sebacic, glutaric pimelic, dimethylmalonic and other straight or branched chain acids having from 4 to 12 carbon atoms.

Polyhydric alcohols which may be used in the polycondensation reaction, include aromatic, aliphatic and heterocyclic alcohols such as ethylene glycol, propane-1,2-diol, propane-1,3-diol, butane-1,4-diol, 2,2-dimethylolpropane, hexane-1,6-diol and 1,1,1-trimethylolpropane as well as mixtures of these alcohols. Other dihydroxy compounds include hydroquinone dihydroxy naphthalene resorcinol, etc. Such compounds chemically contain from 2 to 20 carbon atoms if they are monomeric in nature, however, the dihydroxy compounds chemically also include the polyethylene glycols. Other low polymers which are bifunctional and may contain internal ether, thioether, sulphone, carboxy urethane and other linkages are included.

Further specific examples include 2-methyl-1,5-pentane diol, diethylene glycol, triethylene glycol, 2,2-diethyl isopropyl-1,3-diol, 2,2-diethyl-3-isopropyl-1,3-propane diol, polyethylene glycol, polybutylene glycol, and copolymers of tetrahydrofuran with alkylene oxides preferably with ethylene and/or propylene oxide, polythioethers, such as polycondensates of thiodiglycol with a di- or polyhydric alcohol listed among the polyesters above, polyesteramides, and polyacetals which are formed by polycondensation of formaldehyde with the di- and polyhydric alcohols mentioned above and thiodiglycols.

The organic isocyanates which may be used in accordance with this invention may be either aliphatic, cycloaliphatic or aromatic isocyanates. Compounds containing two or more isocyanate groups are preferred. Included in the isocyanates are the di- or polyisocyanates which contain uretdione, urea and biuret groups as well as masked di- or polyisocyanates. Among the specific isocyanate compounds which may be used are aromatic diisocyanates such as toluylene-2,4-diisocyanate, toluylene-2,6-diisocyanate, and mixtures of the toluylene-2,4- and 2,6-diisocyanates, 3,3'-dimethyl-4,4'-diphenyl diisocyanate, 1,3-diphenylmethane diisocyanate, 1,5-naphthylene diisocyanate, p,p-diphenylmethane diisocyanate, metaphenylene diisocyanate, para-phenylene diiisocyanate, hexamethylene diisocyanate, dimeric toluylene-2,4-diisocyanate,4,4'-diphenylmethane diisocyanate, xylene diisocyanate, urea diisocyanate, 1,4-naphthylene diisocyanate, diphenyl sulphone-4,4'-diisocyanate, dichlorohexylmethane-4,4'-diisocyanate, tetra-methylene diisocyanate, pentamethylene diisocyanate, 1-chloro-benzene-2,4-diisocyanate, furfurylidene diisocyanate and the like. Other isocyanates which may be used are N,N'-di-(4-methyl-3-isocyanatophenyl)-urea, N,N',N''-tri(6-isocyanatohexyl)-biuret, triphenylmethane-4,4',4''-triisocyanate and the reaction products of 3 mols of toluylene-2,4-diisocyanate with 1 mol of 1,1,1-trimethylol propane.

Of course, chain-lengthening agents may be used to further vary the properties of the synthetic resins. Chain lengthening agents which may be included are, for example, di- and polyhydric alcohols such as butane-1,4-diol, ethylene glycol, di- and triethylene glycol, hexane-1,6-diol, propane-1,2-diol, propane-1,3-diol, 2,2-dimethylolpropane, 1,1,1-trimethylol propane and thiodiglycol, water, phenylene-di-(β-hydroxyethylether), for example phenylene-di-(β-hydroxyether)-1,4-amino alcohols such as 2-aminoethanol, diethanolamino, N-methyldiethanolamine, triethanolamine and N,N-di-(β-hydroxyethyl)-toluylene-1,3-diamines such as hexamethylene diamine, 4,4'-diaminodiphenylmethane, N,N'-dimethyl-4,4'-diaminodiphenylmethane, 3,3'-dichloro-4,4'-diaminodiphenylmethane and chain lengthening agents which contain olefinic double bonds, e.g., glycerol-1-allylether or N,N' - diallyl - N,N' - di - (β - hydroxyethyl) - tetramethylene-biscarbamic acid ester.

The low molecular weight polyoxymethylenes which can be used according to the invention have a molecular weight between 500 and 4,000 and carry stable alcoholic hydroxyl end groups which are reactive with isocyanate groups, can be used for the production of synthetic resins over the whole range of all the variations of the isocyanate polyaddition process. These low molecular weight polyoxymethylenes are highly soluble in the above-mentioned polycondensation or polymerization products at temperatures of from 100 to about 200° C. while the high molecular weight polyoxymethylenes having the same end groups or relatively low molecular paraformaldehyde are only slightly soluble in the polycondensation products. Even though the temperature range may be from 50 to 200° C., it is preferred that the temperature be from 100 to about 200° C. These temperatures are within the usual operating conditions for the production and working up of polyurethane elastomers.

Due to their good solubility and reactivity with isocyanate groups, the low molecular weight polyoxymethylenes can also be reacted at temperatures of from 50° C. to about 200° C., preferably from 100 to 200° C. with lower molecular weight prepolymers containing terminal isocyanate groups, for example those obtained in known manner in the reaction of the above-mentioned polycondensation or polymerization products with an excess of polyisocyanates. In addition, the reactive low molecular weight polyoxymethylenes can be converted with an excess or an equivalent or less than an equivalent quantity of polyisocyanates into products which can be made to react, if desired, together with the known polycondensation or polymerization products and chain-lengthening agents and, if desired, with further addition of polyisocyanates.

By reacting preferably 5 to 40 percent by weight, based on the weight of the hydroxyl group containing polycondensation or polymerization products of a stable low molecular weight polyoxymethylene which has a molecular weight of 500 to 4000 and contains terminal alcoholic hydroxyl groups with an excess of the usual diisocyanates at temperatures of from 100 to 200° C., preferably 130 to 170° C. a homogeneous melt is obtained. This can be worked up by known casting processes into molded articles which have high grade rubbery elastic properties. However, the amount of polyoxymethylene may vary from 5 to 95 percent based on the weight of the polyhydroxyl compound. The time required for casting, removing from the mold and curing correspond to the usual conditions, generally from 1 to 8 hours, preferably from 1 to 5 hours. Shortening of the casting time can be achieved with the aid of the catalysts mentioned below. However, by the addition of acid chlorides to the reaction mixture, the casting time may if desired be lengthened. The hardness of the high molecular elastic synthetic resins can be adjusted as desired by the content of low molecular polyoxymethylene.

The polyisocyanates are used in the usual excess above the equivalent of the reactive hydrogen atoms employed in the casting process. However, the total quantity of polyisocyanate is less than that employed in the customary method for the preparation of polyurethane elastomers due to the absence of chain lengthening agents.

It has already been mentioned that toluylene-(2,4)-diisocyanate and its commercially easily accessible mixtures with the 2,6-isomer, which are not suitable for use in combination with the usual hydroxyl group-containing polycondensation or polymerization product and glycols and chain lengthening agents, give rise to high grade elastic polyurethanes by the casting process when the bifunctional, low molecular polyoxymethylenes are used, if desired without any chain lengthening agent. The process thus provides for the first time an economical method for preparing polyurethane elastomers having desirable properties.

The low molecular weight polyoxymethylenes may if desired also be used in combination with the known hydroxyl group-containing polycondensation or polymerization products by reacting them with less than the equivalent amount of polyisocyanates, necessary to react with the hydroxyl groups and, if desired, with chain lengthening agent in order to produce polyurethanes which are stable on storage and may be rolled. The rollable polyurethane masses constitute high molecular weight, non-cross-linked materials which are preferably linear in construction and which are substantially free of any isocyanate groups. They can be cross-linked in known manner with polyisocyanates by a vulcanization process. In this process, the rollable products are mixed on rubber rollers with fillers, polyisocyanates and if desired accelerators and age-resistors. These mixtures can be cross-linked in conjunction with a forming process or they may first be extruded to form articles or calendered and then subsequently vulcanized. In all cases, high molecular weight, cross-linked synthetic resins which have excellent material properties are obtained. In addition to the cross-linking with polyisocyanates as cross-linking agents, it is also possible to vulcanize with elemental sulphur or compounds which give off sulphur. Other cross-linking agents which may be used are peroxide and formaldehyde or compounds which split off formaldehyde, provided the rollable polyurethane masses contain suitable acceptors. For the sulphur cross-linking olefinic double bonds are preferably incorporated in known manner into the polyurethane chain through chain lengthening agents such as glycerol-1-allylether and N,N'-diallyl-N,N'-di-(β-hydroxyethyl)-tetramethylene-bis-carbamic acid ester. The methylene bridge of 4,4'-diphenylmethane diisocyanate is already sufficient for peroxide cross-linking. For formaldehyde cross-linking, chain lengthening agents such as N,N'-di-(β-hydroxyethyl)-toluidine-1,3 are found to be especially suitable. Isocyanate cross-linking can also be achieved by incorporating into the rollable polyurethane masses, masked isocyanates, for example, compounds containing uretdione groups, which liberate isocyanate groups in the vulcanization process.

To obtain great hardness in the isocyanate cross-linking, it is customary to incorporate chain lengthening agents such as phenylene-di-(β-hydroxyethylether) into the rollable polyurethanes. The melting points of the suitable chain lengthening agents should not be much below the vulcanization temperature of from about 120 to 180° C. However, since the melting points of the low molecular bifunctional polyoxymethylene are between about 120 and 180° C., they are eminently suitable for this purpose. As rollable polyurethanes there may also be used products which are obtained in known manner by reacting dichlorocarbonic acid esters of the hydroxyl group-containing polycondensation or polymerization products with diamines.

The preparation of polyurethane elastomers which can be granulated and worked up thermostatically by reacting hydroxyl group-containing polycondensation or polymerization products with diisocyanates and chain lengthening agents is already known. These materials contain a relatively large quantity of urethane groups and a relatively small excess of diisocyanate over and above the equivalents of reactive hydrogen atoms present as compared with the cross-linked high molecular weight synthetic resins obtainable by the casting process. By using 5 to 40 parts by weight of low molecular weight polyoxymethylenes having a molecular weight of 500 to 4000 and stable alcoholic hydroxyl end groups per 100 parts by weight of the known hydroxyl group-containing polycondensation or polymerization products, it is possible to obtain with the usual polyisocyanates, and if desired, chain lengthening agents, polyurethanes which can be granulated and worked up thermoplastically to form articles having high grade rubbery elastic properties. However, these polyurethanes may be worked up thermoplastically without using any chain lengthening agents. The use of chain lengthening agents increases the versatility of these polyurethanes. The elastic synthetic resins thus obtained from the thermoplastic materials show a definite reduction in the permanent elongation, which is well known to be high in the conventional polyurethane elastomers and a high elongation at break.

Owing to the reactivity and compatibility of the bifunctional low molecular weight polyoxymethylenes with the components of the isocyanate polyaddition process, it is possible in principle to replace the hydroxyl group-containing polycondensation or polymerization products practically entirely by low molecular weight polyoxymethylenes. If the polyoxymethylene content is very high, the materials thus obtained have properties which do not correspond to the conventional polyurethane elastomers.

The proportion of low molecular weight polyoxymethylene to hydroxyl group-containing polycondensation or polymerization products may vary suitably from about 5 to 95 parts by weight of polyoxymethylenes to 100 parts by weight of hydroxyl group-containing polycondensation or polymerization products, preferably, from about 5 to 40 parts of low molecular polyoxymethylene to 100 parts by weight of hydroxyl group-containing polycondensation or polymerization products.

The use of low molecular weight polyoxymethylenes is not confined to the processes heretofore described for the preparation of high molecular weight rubbery elastic synthetic resins. Due to the numerous processes for carrying out the isocyanate polyaddition reaction, the polyoxymethylenes can be used in conventional manner for the production of, for example, rubbery elastic polyurethane threads, synthetic resins of a cellular structure, foam plastics, coatings, lacquers and adhesives. In particular, they are also suitable for the production of high molecular weight rubbery elastic synthetic resins by the spray process.

The low molecular weight polyoxymethylene content imparts to the synthetic resins according to the invention the same good resistance to organic solvents and improved resistance to swelling in the presence of aromatic hydrocarbons which are observed also in synthetic resins obtained from mixtures, which can be worked up thermoplastically, of high molecular weight polyoxymethylenes with high molecular polyurethanes. The products of the process may, of course, be treated with age-resistors of all kinds, especially with agents which protect against hydrolysis e.g. carbodiimides.

Although a catalyst is not essential, it is preferred that a catalyst be used for accelerating the isocyanate reaction. Examples of catalysts which may be used are tertiary amines, such as, trimethylamine, triethylamine, tri-n- propylamine, tri-n-butylamine, triisobutylamine, tri-n-amylamine, methyldiethylamino amine as well as 1,4-diaza-(2,2,2)-bicyclooctane, and metal salts, especially salts of di- and tetravalent tin. In addition, alkali and alkaline earth salts, such as, sodium formate and sodium monochloroacetate may be used as catalysts. The amount of alkali salts, such as, sodium formate, obtained from the depolymerization of low molecular weight polyoxymethylene copolymers carried out in an alkaline medium can be left in the stabilized low molecular weight polyoxymethylenes which contain alcoholic hydroxyl end groups. The amount of alkali salts in the low molecular weight polyoxymethylenes can be easily adjusted to the desired amount and thus can be utilized in achieving the desired catalysis of the isocyanate reaction.

The amount of catalyst used in the isocyanate reaction is not critical; however, a sufficient amount should be used in order to complete the reaction within a reasonable time. The amount of catalyst may vary from 0.001 percent up to about 10 percent by weight of the reaction mass, preferably from about 0.002 to about 5 percent by weight.

The invention will be further illustrated by the following examples, the parts being by weight unless otherwise specified.

PREPARATION OF A POLYOXYMETHYLENE

Example 1(a)

Approximately 45 parts by volume of boron trifluoride etherate are added dropwise in the course of 30 minutes to a solution containing about 1215 parts of trioxane and about 999 parts of 1,3-dioxolane and about 1200 parts of methylene chloride. The temperature of the exothermic reaction rises to the boiling point where it is maintained at reflux temperature for about 6 hours. The precipitate is removed by vacuum filtration, washed with methylene chloride and dried. The copolymer is then suspended in about 800 parts by volume of 5 percent aqueous sodium hydroxide and about 600 parts by volume of n-propanol and refluxed for about 8 hours. After cooling the polyoxymethylene which has been depolymerized to form comonomer units at the chain ends, it is vacuum filtered, washed free from alkali with water and dried to constant weight at a temperature of about 100° C. About 945 parts of a colorless polyoxymethylene (OH number 44.6) having alcoholic hydroxyl groups is obtained. The product melts at a temperature between about 160 to 170° C. Analysis of the elements indicates a dioxolane content of 13.5%.

PREPARATION OF A POLYURETHANE

Example 1(b)

Approximately 200 parts of an adipic acid-ethylene glycol polyester (OH number 56) are dried for about 30 minutes at a temperature of about 130° C. in vacuo. About 20 parts of the material prepared as above are added, and the mixture heated to about 150° to about 160° C. to form a thick homogeneous liquid melt. About 22 parts of a mixture containing about 65 parts of toluylene-diisocyanate-2,4 and about 35 parts of toluylene-diisocyanate-2,6 are added to the liquid melt and agitated for about one minute. The easily pourable homogeneous mixture is poured into a plate mold which has been treated with a mold parting agent and heated to a temperature of about 100° C. The mass solidified after about 2 minutes, and after heating for about one-half hour at 100° C., the cast plate can be removed from the mold. After the plate is removed from the mold, it is then heated for an additional 15 to 20 hours at 100° C. The resulting product has the following mechanical test values:

Thickness of the test plate—5.8 mm.
Tensile strength—272 kp./cm.²
Elongation at break—690%
Permanent elongation—12%
Ring structure—52 kp.
Shore hardness A—80
Elasticity—54%

Example 2

(a) Preparation of the starting material.—60 parts by volume of boron trifluoride diethyl etherate are added to a solution of 1620 parts by weight of trioxane, 888 parts by weight of dioxolane and 24 parts by weight of ethylene glycol in 1600 parts by volume of methylene chloride in such a rate that the temperature of the reaction mixture is allowed to rise to 40° C. where it is maintained. Having accomplished the addition of the catalyst the mixture is stirred for 6 hours at 40° C. The copolymerisate is according to the procedure described in Example 1(a), isolated and degraded. 1390 parts by weight of a thermostable polyoxymethylene (OH number 47) are obtained having a dioxolane content of 15%.

(b) Process according to the invention.—A mixture of 200 parts by weight of a dried adipic acid-ethylene glycol polyester (OH number 56) and 40 parts by weight of polyoxymethylene Example 2(a) are heated to 150 to 160° C. 26 parts by weight of a mixture of 65 parts by weight of 2,6 - toluylene diisocyanate and 35 parts by weight of 2,4 - toluylene diisocyanate are stirred in during the course of one minute. The pourable homogenous melt is cast into a plate mold. The cast plate can be removed from the mold already after three minutes. The plate is then heated for 15 to 20 hours to 100° C.. It has the following mechanical test values:

Thickness of the test plate—5.2 mm.
Tensile strength—294 kp./cm.²
Elongation at break—625%
Permanent elongation—22%
Ring Structure—34 kp.
Shore hardness A—87
Elasticity—44%

Example 3

(a) Preparation of the starting material.—In the course of about one hour 30 parts by weight of boron trifluoride diethyl etherate are dropped at 5 to 10° C. by intensive cooling to a solution of 198 parts by weight of ethylene oxide, 405 parts by weight of trioxane and 10 parts by weight of ethylene glycol. Having accomplished the addition stirring is continued for one hour at 10° C. The reaction mixture is heated to 40° C. and maintained at this temperature for further six hours. Isolation and degradation of the copolymerisate to the copolymeric units at the end of the chains are carried through according to Example 1(a). 257 parts by weight of a polyoxymethylene (OH number 51) having a content of ethylene oxide of 16% are obtained.

(b) Process according to the invention.—The solution of 0.005 parts by weight of sodium formate in 0.5 parts by volume of water is added to 200 parts by weight of adipic acid-ethylene glycol polyester (OH number 56) and the mixture is dried by heating to 130° C. in vacuo for half an hour. Having added 20 parts by weight of polyoxymethylene Example 3(a) the mixture is heated to 150 to 160° C. To the homogenous melt 28 parts by weight of diphenyl methane diisocyanate - 4,4' are added in the course of a minute. The pourable melt is cast into a plate mold wherefrom it can be removed after 15 minutes. Having heated the plate for 15 to 20 hours it has the following mechanical values:

Thickness of the test plate—6.1 mm.
Tensile strength—251 kp./cm.²
Elongation at break—760%
Permanent elongation—15%
Ring structure—51 kp.
Shore hardness A—77
Elasticity—46%

Example 4

To a solution of 20 parts by weight of the polyoxymethylene of Example 2(a) in 200 parts by weight of dried adipic acide-ethylene glycol polyester (OH number 56) are added by stirring in the course of a minute at 150 to 160° C. 20 parts by weight of 2,4 - toluylene diisocyanate and 4 parts by weight of 4,4' - diphenyl methane diisocyanate. The obtained pourable melt is transformed to a test specimen which has the following mechanical test values:

Thickness of the test plate—4.6 mm.
Tensile strength—278 kp./cm.$^2$
Elongation at break—675%
Permanent elongation—12%
Ring structure—30 kp.
Shore hardness A—79
Elasticity—51%

Example 5

20 parts by weight of the polyoxymethylene according to Example 1(a) are dissolved at 150 to 160° C. in 200 parts by weight of dried adipic acid-ethylene glycol polyester (OH number 56). To this solution are added stepwise at 150 to 160° C. 160 parts by weight of 4,4'-diphenyl methane diisocyanate and 46 parts by weight of 1,4-butane diol, each in the course of one minute. The melt is cast to a plate of a thickness of about 2 cm. This plate is heated to 100° C. for 2½ hours and is finally granulated. The granulate is thermoplastically transformed to test specimens having the following mechanical values:

Tensile strength—380 kp./cm.$^2$
Elongation at break—450%
Modulus at 300% elongation—254 k.p./cm.$^2$
Permanent elongation—25%
Structure—78 kp.
Shore hardness A—97
Elasticity—26%

Example 6

A mixture of 20 parts by weight of the polyoxymethylene according to Example 1(a), 200 parts by weight of adipic acid-ethylene glycol polyester, 80 parts by weight of 4,4'-diphenyl methane diisocyanate and 18 parts by weight of 1,4-butane diol are transformed to a granulate according to Example 5. The granulate is transformed to test specimens on a screw type injection molding machine. The specimens have the following mechanical properties.

Tensile strength—330 kp./cm.$^2$
Elongation at break—700%
Modulus at 300% elongation—94 kp./cm.$^2$
Permanent elongation—23%
Structure—74 kp.
Shore hardness A—84
Elasticity—30%

Example 7

50 parts by weight of the polyoxymethylene according to Example 2(a) are homogenously stirred at 150 to 160° C. into 500 parts by weight of a mixed polyester of adipic acid, ethylene glycol and 1,4-butane diol (OH number 56) which has been dried at 130° C. in vacuo. Into this solution are stirred stepwise 200 parts by weight of 4,4'-dipenyl methane diisocyanate and 45 parts by weight of 1,4-butane diol, each in the course of one minute. The reaction product is cast into a plate of about 2 cm. thickness. This plate is granulated having been heated for 2½ hours at 100° C. and transformed to specimens by injection molding. The specimens have the following test values:

Tensile strength—182 kp./cm.$^2$
Elongation at break—640%
Modulus at 300% elongation—61 kp./cm.$^2$
Permanent elongation—32%
Structure—48 kp.
Shore hardness A—85
Elasticity—33%

Example 8

A mixture of 500 parts by weight of adipic acid-ethylene glycol polyester (OH number 56), 50 parts by weight of the polyoxymethylene according to Example 2(a), 100 parts by weight of hydroquinone-di-($\beta$-hydroxy ethyl ether) and 145 parts by weight of a mixture consisting of 35 parts by weight of 2,6-toluylene diisocyanate and 65 parts by weight of 2,4-toluylene diisocyanate is transformed according to Example 7 by injection molding to test specimens. The following values are obtained:

Tensile strength—175 kp./cm.$^2$
Elongation at break—860%
Modulus at 300% elongation—24 kp./cm.$^2$
Permanent elongation—30%
Structure—26 kp.
Shore hardness A—64
Elasticity—15%

Example 9

A mixture of 500 parts by weight of adipic acid-ethylene glycol polyester (OH number 56), 150 parts by weight of the polyoxymethylene of Example 2(a) and 55 parts by weight of a mixture consisting of 2,4-toluylene diisocyanate and 2,6-toluylene diisocyanate (65:35) is transformed according to the process described in Examples 7 and 8 to test specimens having the following properties:

Tensile strength—210 kp./cm.$^2$
Elongation at break—750%
Modulus at 300% elongation—95 kp./cm.$^2$
Structure—44 kp.
Shore hardness A—80
Elasticity—40%

Example 10

(a) Preparation of the starting materials.—900 parts by weight of trioxane and 120 parts by weight of propylene oxide are dissolved in 900 parts by volume of cyclo hexane. The solution is heated to 50° C. and 25 parts by volume of boron trifluoride diethyl etherate are added dropwise in such a rate that the reaction mixture is kept boiling under reflux. Stirring is continued for six hours under reflux. The precipitate of the copolymerisate is removed by vacuum filtration, washed with acetone, dried and depolymerised in the described manner with aqueous sodium hydroxide (5%). 540 parts by weight of precipitate are obtained (OH number 28) having a content of 7.5% propylene oxide.

(b) Process according to the invention.—50 parts by weight of polyoxymethylene Example 10(a) are dissolved at 150 to 160° C. in the dried mixture of 250 parts by weight of adipic acid-ethylene glycol polyester (OH number 56) and 250 parts by weight mixed polyester consisting of adipic acid, ethylene glycol and 1,4-butane diol (OH number 56).

To the mixture are added by stirring in the course of one minute 42.5 parts by weight of a mixture consisting of 2,4-toluylene diisocyanate and 2,6-toluylene diisocyanate (65:35). The melt is cast in a vessel which has been treated with a mold release agent and heated to 100° C. for 20 hours. The obtained mass can be rolled on a rubber roller to a sheet. 0.5 part by weight of stearic acid, 20 parts by weight of carbon black, 10 parts by weight of dimeric 2,4-toluylene diisocyanate and 0.3 part by weight of a salt consisting of lead and 3-mercapto-triazol-(1,2,4) as accelerator are rolled in 100 parts by weight of the afore-said sheet. The mixture obtained in the described manner is transformed to specimens by vulcanisation for half an hour at 132° C. having the following properties:

Tensile strength—221 kp./cm.²
Elongation at break—593%
Permanent elongation—35%
Structure—32 kp.
Shore hardness A—85
Elasticity—44%
Abrasion according to DIN 53 516—36

Example 11

A mixture of 500 parts by weight of mixed polyester consisting of adipic acid, ethylene glycol and butane diol-(1.4) (OH number 56), 50 parts by weight of the polyoxymethylene according to Example 1(a) and 42.5 parts by weight of a mixture of isomers consisting of 65 parts by weight of 2,4-toluylene diisocyanate and 35 parts by weight of 2,6-toluylene diisocyanate is transformed according to the process described in Example 10 to a rollable product. This product can be vulcanised having added the components according to Example 10 by rolling to a synthetic resin which has the following properties:

Tensile strength—173 kp./cm.²
Elongation at break—692%
Permanent elongation—20%
Structure—18 kp.
Shore hardness A—72
Elasticity—52%
Abrasion according to DIN 53 516—67

Example 12

Instead of the mixed polyester of Example 11 an adipic acid-1,6-hexane diol polyester of average molecular weight of about 1000 is used having been elongated to an average molecular weight of about 2000 by adding ½ mol of 2,4-toluylene diisocyanate. Instead of 42.5 parts by weight of an isomeric mixture of toluylene diisocyanate 37.5 parts by weight are used. The process is carried through according to Example 11. The vulcanised test specimens have the following properties:

Tensile strength—174 kp./cm.²
Breaking elongation—425%
Permanent elongation—10%
Structure—15 kp.
Shore hardness A—74
Elasticity—46%
Abrasion according to DIN 53 516—57

Example 13

0.5 part by weight of stearic acid, 24 parts by weight of the polyoxymethylene of Example 2(a), 10 parts by weight of dimeric 2,4-toluylene diisocyanate and 0.3 part by weight of a salt consisting of lead and 3-mercaptotriazol-(1,2,4) are added by rolling to 100 parts by weight of a mixture consisting of 100 parts by weight of adipic acid-diethylene glycol polyester (OH number 46), 13 parts by weight of 2,4-toluylene diisocyanate and 0.9 part by weight of water which are transformed to a rollable product according to the known procedure. After vulcanisation of the product at 132° C. for half an hour test specimens with the following properties are obtained:

Tensile strength—253 kp./cm.²
Breaking elongation—735%
Permanent elongation—37%
Structure—24 kp.
Shore hardness A—83
Elasticity—47%
Abrasion according to DIN 53 516—30

Example 14

A homogenous mixture of 100 parts by weight of adipic acid-ethylene glycol polyester (OH number 56), 100 parts by weight of the polyoxymethylene of Example 2(a) and 13 parts by weight of 2,4-toluylene diisocyanate having been prepared at 150 to 160° C. is stirred for 20 hours at 100° C. A high molecular synthetic resin of extremely high toughness is obtained. The material can be granulated and is thermoplastically processible. The melt is processed in a spinning procedure and filaments are obtained which are expandable at room temperature, which is not possible with high molecular polyoxymethylene, and which are much more elastic than filaments of high molecular polyoxymethylene.

Example 15

20 parts by weight of the polyoxymethylene according to Example 10(a) and 0.84 part by weight of 1,6-hexamethylene diisocyanate are heated in 100 parts by volume of chloro benzene for 2½ hours under reflux. A product is obtained whose properties are highly similar to those of a known thermostable high molecular polyoxy methylene having an inner viscosity of 0.8 to 1.6 in a concentration of 0.5% by weight in p-chloro phenol at 60° C. The starting material has under comparable conditions e.g. 0.5% solution in p-chloro phenol at 60° C. an inner viscosity of only 0.1 to 0.2. The specimens obtained from the reaction product have a tensile strength of 510 kp./cm.² with an elongation at break of 37%.

Example 16

17 parts by weight of 1,6-hexamethylene diisocyanate, 9 parts by weight of 1,4-butane diol and 6 parts by weight of the polyoxymethylene of Example 1(a) are heated in 50 parts by volume of chloro benzene. Exothermic reaction begins at about 95° C. and reaction mixture starts boiling. Boiling is continued for half an hour under reflux. During this time a high molecular reaction product precipitates in shape of sand and is isolated, washed and dried. It is transformed according to the melt spinning procedure to bristles. X-ray analysis of materials of this kind shows that the low molecular weight polyoxymethylene is nearly completely degraded.

Example 17

A mixture of 250 parts by weight of adipic acid-ethylene glycol polyester (OH number 56), 125 parts by weight of a mixed polyester consisting of adipic acid, ethylene glycol and 1,4 - butane diol (OH number 56) and 125 parts by weight of a mixed polyester of adipic acid, neopentyl glycol and 1,6-hexane diol (OH number 65) are dried at 130° C. in vacuo. 10 parts by weight of hydroquinone-di-(β-hydroxyethylether) and 200 parts by weight of the polyoxymethylene of Example 2(a) are added to the afore-said mixture of polyesters at 150 to 160° C. to a clear solution. At the same temperature 67, 5 parts by weight of an isomeric mixture at 2,4-toluylene diisocyanate and 2,6-toluylene diisocyanate (65:35) are added in the course of one minute by stirring. The homogenous mass is transformed by casting to a plate of a thickness of about 2 cm. After three minutes the product has got a stable form. It is heated to 90 to 100° C. for three hours and granulated. The granulate is transformed on a screw type injection molding machine to specimens having the following mechanical test values:

Tensile strength—183 kp./cm.²
Elongation at break—760%
Permanent elongation—62%
Ring structure—42 kp.
Shore hardness A—86
Elasticity—45%

Example 18

500 parts by weight of polypropylene glycol (OH number 56) are dried at 130° C. for half an hour under water-jet vacuum. 147 parts by weight of 4,4'-diphenyl methane diisocyanate are added at 90° C. The reaction mixture is heated to 130° C. and kept at this temperature for half an hour by exclusion of humidity. The reaction mixture is cooled to 90° C., 30 parts by weight of 1,4-butane diol are stirred in during 5 minutes and the melt is finally heated to 100° C. for 20 hours. 100 parts by weight of the rollable described reaction product are added by rolling on a rubber roller to 24 parts by weight of the polyoxy methylene according to Example 2(a), 20 parts by weight of carbon black, 12 parts by weight of dimeric 2,4-toluylene diisocyanate, 0.5 part by weight of stearic acid and 0.3 part by weight of the accelerator according to Example 10. Having vulcanized this mixture at 132° C. test specimens are obtained with the following mechanical values:

Tensile strength—193 kp./cm.$^2$
Elongation at break—352%
Permanent elongation—25%
Ring structure—29 kp.
Shore hardness A—86
Elasticity—34%

Comparison Example A

The polyurethane is prepared as in Example 1 but using 20 parts by weight of a polyacetal prepared by condensation of diethylene glycol and formaldehyde (OH number 75) instead of the 20 parts by weight of the polyoxymethylene. A reaction mixture is obtained which gives a mass showing blisters in the curing step and which even after 20 hours at 100° is not yet completely reacted.

Comparison Example B

The procedure is as in Example 2 using a commercial high molecular weight polyoxymethylene (average molecular weight 4000) with alcoholic hydroxyl terminal groups instead of the polyoxymethylene prepared as in Example 2. It is not possible to obtain a homogeneous melt because of the high viscosity of the polyoxymethylene. It is impossible to cast moldings.

Comparison Example C 200 parts by weight of a polyacetal prepared by condensation of diethylene glycol and formaldehyde (OH number 56), 80 parts by weight of 4,4'-diphenyl methane diisocyanate and 18 parts by weight of 1,4-butane diol are transformed to a granulate according to Example 5. It is not possible to transform the granulate into moldings on a screw type injection molding machine.

It has already been shown with the aid of the above examples that the preparation of high molecular polyurethanes with the use of bifunctional low molecular weight polyoxymethylenes is, surprisingly, possible without the use of any chain lengthening agent.

The elastic properties and the hardness of the polyurethane resins heretofore produced, are due primarily to the use of chain lengthening agents in the formation of a polyurethane product having a mass of crystalline segments. These crystalline segments are due to the heaping of urethane groups which impart these characteristics to the resins through hydrogen bridges, dispersion forces and genuine cross linking through allophanate or biuret bonds. However, the products of the present invention utilize highly crystalline low molecular weight polyoxymethylenes which not only assume the function of the crystalline urethane blocks, but exceed this function by having on the one hand a higher activity than the usual chain lengthening agents, and on the other hand being virtually ideal crystalline segments, thereby providing for high grade elastic resins even with diisocyanates having an asymetrical structure or isocyanates having —NCO groups of varying reactivities. Even in the absence of a large number of urethane groups in the elastic resins produced solely from low molecular weight polyoxymethylene or even with the addition of other hydroxyl groups containing polycondensation or polymerization products as well as polyisocyanates, the chance of crosslinking through allophanate bonds is relatively small.

If desired, additional components, such as pigments, fillers, plasticizers, and the like, which are frequently incorporated into resins and resin blends, may be incorporated in accordance with the conventional practices of the art.

It is of course to be understood that the invention is not limited by the particular working examples as set forth, but that any of the compounds set forth previously may be substituted into the examples for those contained therein, for example, any of the organic diisocyanates listed above may be substituted for the particular diisocyanates utilized in the working examples.

Although the invention has been described in considerable detail in the foregoing for the purposes of illustration, it is to be understood that such detail is solely for this purpose and that variations can be made therein by those skilled in the art without departing from the spirit and scope of the invention except as set forth in the claims.

What is claimed is:

1. High molecular weight polyurethane resin prepared by a process which comprises reacting (1) a composition comprising a polyhydroxyl compound selected from the group consisting of hydroxyl polyesters and polyhydroxyl polyalkylene ethers and (2) a depolymerized polyoxymethylene having alcoholic hydroxyl groups and being substantially free from semi-acetalic hydroxyl groups and a molecular weight within the range of from about 500 to 4000 with (3) an organic polyisocyanate at a temperature of from about 50° C. to 200° C., said depolymerized polyoxymethylene being present in an amount of from about 5 to about 95% based on the weight of the polyhydroxyl compound.

2. The product of claim 1 wherein the organic polyisocyanate is 2,4-toluylene diisocyanate.

3. The product of claim 1 wherein the organic polyisocyanate is a diisocyanate.

4. The product of claim 1 wherein the quantity of organic polyisocyanate is sufficient to react with all of the hydroxyl groups present in said composition.

References Cited

UNITED STATES PATENTS

| | | | |
|---|---|---|---|
| 2,987,504 | 6/1961 | Wagner | 260—75 |
| 3,147,234 | 9/1964 | Polly | 260—67TN |
| 2,801,990 | 8/1957 | Seeger et al. | 260—75TNK |
| 3,144,431 | 8/1964 | Dolce et al. | 260—67FPX |
| 3,219,623 | 11/1965 | Berardinelli | 260—67FPX |
| 3,249,654 | 5/1966 | von Bonin et al. | 260—67FPX |
| 3,265,665 | 8/1966 | Mantell et al. | 260—67FP |

FOREIGN PATENTS

| | | | |
|---|---|---|---|
| 875,560 | 8/1961 | Great Britain | 260—67FP |
| 1,221,148 | 5/1961 | France | 260—67FP |

OTHER REFERENCES

Schonfeld, Journal of Polymer Science, vol. XLIX, pp. 277–282 (1961).

WILLIAM SHORT, Primary Examiner

L. M. PHYNES, Assistant Examiner

U.S. Cl. X.R.

260—67, 75, 77.5, 835